(12) United States Patent
Lu

(10) Patent No.: US 7,367,129 B2
(45) Date of Patent: May 6, 2008

(54) HAND-HELD LASER LEVEL WITH RETRACTABLE ADHESIVE-TYPE RETENTION FEATURE

(75) Inventor: Jian Hong Lu, Changzhou (CN)

(73) Assignee: Johnson Level & Tool Mfg. Co., Inc., Mequon, WI (US)

( * ) Notice: Subject to any disclaimer, the term of this patent is extended or adjusted under 35 U.S.C. 154(b) by 0 days.

(21) Appl. No.: 11/145,093

(22) Filed: Jun. 3, 2005

(65) Prior Publication Data

US 2006/0112576 A1 Jun. 1, 2006

(51) Int. Cl.
*G01C 15/00* (2006.01)
(52) U.S. Cl. .................... 33/286; 33/DIG. 21; 33/347; 33/370
(58) Field of Classification Search .................. 33/286, 33/DIG. 21, 227, 228, 347, 353, 354, 370, 33/371, 376, 758, 760, 768, 770, 276, 277, 33/278, 281, 282, 283, 285, 290; 248/205.2, 248/205.4
See application file for complete search history.

(56) References Cited

U.S. PATENT DOCUMENTS

| | | | | |
|---|---|---|---|---|
| 1,153,760 | A | * | 9/1915 | Butler ........................ 33/370 |
| 4,421,288 | A | * | 12/1983 | Blaszkowski ............. 248/205.4 |
| 5,063,679 | A | * | 11/1991 | Schwandt .................... 33/347 |
| 6,182,938 | B1 | * | 2/2001 | Wright ....................... 248/468 |
| 6,293,024 | B1 | * | 9/2001 | Fiebig et al. ................ 33/375 |
| 6,502,319 | B1 | | 1/2003 | Goodrich et al. |
| 6,532,676 | B2 | | 3/2003 | Cunningham |
| 6,606,798 | B2 | | 8/2003 | El-Katcha et al. |
| 6,735,879 | B2 | | 5/2004 | Malard et al. |
| 7,055,252 | B2 | * | 6/2006 | Wu ............................. 33/286 |
| 7,089,676 | B2 | * | 8/2006 | Godinez ..................... 33/371 |
| 7,243,433 | B2 | * | 7/2007 | Wu ............................. 33/286 |
| 7,278,218 | B2 | * | 10/2007 | Levine ....................... 33/286 |
| 2004/0031163 | A1 | | 2/2004 | El-Katcha et al. |
| 2004/0103546 | A1 | | 6/2004 | Marshall |
| 2004/0123472 | A1 | | 7/2004 | Wu |
| 2005/0022399 | A1 | * | 2/2005 | Wheeler et al. ............ 33/286 |
| 2005/0155238 | A1 | * | 7/2005 | Levine et al. .............. 33/286 |
| 2005/0206891 | A1 | * | 9/2005 | Khubani .................... 356/249 |
| 2005/0278966 | A1 | * | 12/2005 | Liu ............................. 33/286 |
| 2006/0112576 | A1 | * | 6/2006 | Lu .............................. 33/286 |
| 2006/0231705 | A1 | * | 10/2006 | Liu ........................... 248/205.5 |
| 2007/0056173 | A1 | * | 3/2007 | Burry et al. ................. 33/286 |

* cited by examiner

*Primary Examiner*—G. Bradley Bennett
*Assistant Examiner*—Amy Cohen Johnson
(74) *Attorney, Agent, or Firm*—Boyle Fredrickson, S.C.

(57) ABSTRACT

A leveling or plumbing device for indicating a line or a plane on a surface, such as wall or floor. The device includes a light beam generator that emits a light beam exteriorly of a body or housing. Level and/or plumb indicators, such as vials, are mounted to the housing for positioning the device in a predetermined orientation on the surface. The device includes a series of extendible and retractable engagement members, each of which defines an outer end having an adhesive. The adhesive engages the surface to releasably secure the device to the surface. The engagement members are biased inwardly toward a retracted position. The adhesive engagement of the engagement members with the surface maintains the engagement members in the extended position against the inward bias.

15 Claims, 5 Drawing Sheets

HAND-HELD LASER LEVEL WITH RETRACTABLE ADHESIVE-TYPE RETENTION FEATURE

BACKGROUND AND SUMMARY OF THE INVENTION

This invention relates to leveling and/or plumbing devices, and more particularly to a leveling or plumbing device that can be secured in position on a surface such as a wall.

Leveling and/or plumbing devices are used in construction or other applications for marking or determining the level or plumb orientation of an object or surface. Many devices of this type utilize a laser generator that emits a beam of light, typically in a fan-type planar configuration, to provide the user with a visual representation of level or plumb on a surface. In order to fix the orientation of the device relative to the surface, which may be a floor or wall, it has been known to provide the device with extendable and retractable pins, which penetrate the surface and serve to temporarily secure the device to the surface. While this type of temporary mounting arrangement functions satisfactorily to fix the position of the device relative to the surface, it is disadvantageous in that the pins leave holes in the surface that must be filled after use. In addition, this type of mounting arrangement does not allow slight alterations in the orientation of the device after engagement with the surface, in the event the device is not truly level or plumb when the pins are first inserted into the surface. Furthermore, this type of mounting arrangement can only be employed when the device is used on a surface that is capable of being penetrated by the pins. Accordingly, a temporary mounting arrangement of this type cannot be used on hard surfaces such as concrete, tile or the like.

It is an object of the present invention to provide a leveling and/or plumbing device that can be temporarily mounted to virtually any type of surface, regardless of the nature of the surface material. It is another object of the invention to provide such a device which can be easily and quickly secured in position on a surface. A further object of the invention is to provide such a device in which the orientation of the device can be adjusted slightly when temporarily mounted to the surface, to enable the user to accurately position the device. A still further object of the invention is to provide such a device which operates in a manner similar to prior art devices yet which overcomes the many disadvantages of such prior art devices.

In accordance with one aspect of the invention, a leveling device for use on a work surface includes a body defining a surface; a light beam emitter contained within the body for emitting a light beam exteriorly of the body in a predetermined orientation relative to the body; and an engagement arrangement associated with the body for selectively maintaining the body in position on the work surface. The engagement arrangement includes at least one extendible and retractable engagement member and an adhesive carried by the engagement member. The extendible and retractable engagement member is movable between a retracted position in which the adhesive is positioned inwardly of the surface of the body, and an extended position in which the adhesive is positioned outwardly of the surface of the body for engagement with the work surface to selectively maintain the body in position on the work surface. The engagement arrangement further includes a biasing arrangement associated with the engagement arrangement for biasing the at least one extendible and retractable engagement member toward the retracted position. The biasing arrangement may be in the form of a spring that is configured and arranged to act on the engagement member to bias the engagement member toward the retracted position. The engagement arrangement may be in the form of a pair of spaced apart engagement members, and may also include a third engagement member at a location spaced from the pair of spaced apart engagement members.

The surface of the body may be in the form of a downwardly facing surface, and the body may include an upwardly facing surface facing in a direction opposite that of the downwardly facing surface. The body may include a passage within which each engagement member is located. Each passage extends between the upwardly facing surface and the downwardly facing surface of the body, and each engagement member includes an upwardly facing actuating surface for manual engagement by a user to enable the user to move the engagement member from the retracted position to the extended position. The engagement member is configured and arranged such that downward movement of the upwardly facing actuating surface by the user causes downward movement of the engagement member within the passage, to move the adhesive outwardly relative to the downwardly facing surface of the body into engagement with the work surface. In one form, the adhesive may be a mass of adhesive material removably contained within a recess in an end defined by the engagement member.

The invention also contemplates a method of maintaining the position of a leveling device on a work surface, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
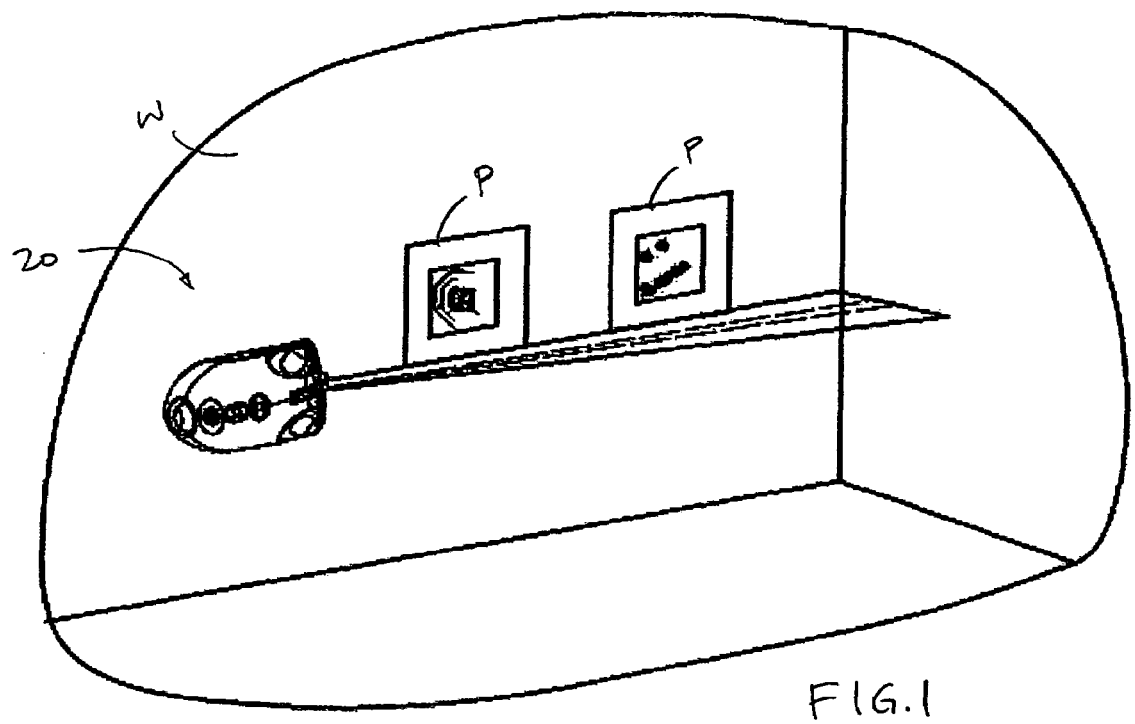
FIG. 1 is an isometric view illustrating a laser-type leveling and plumbing device in accordance with the present invention, which is releasably engaged with a surface such as a wall for illuminating a horizontal plane on the wall.

Referring to FIG. 1, a leveling and plumbing device 20 in accordance with the present invention is shown in position on a wall W for providing a visual representation of a horizontal plane on wall W. Representatively, device 20 may be used to vertically align lower edges of pictures P that are mounted to wall W, although it is understood that device 20 may be used in any other application in which it is desired to provide an indication of a horizontal reference plane on wall W.

Figure 2:
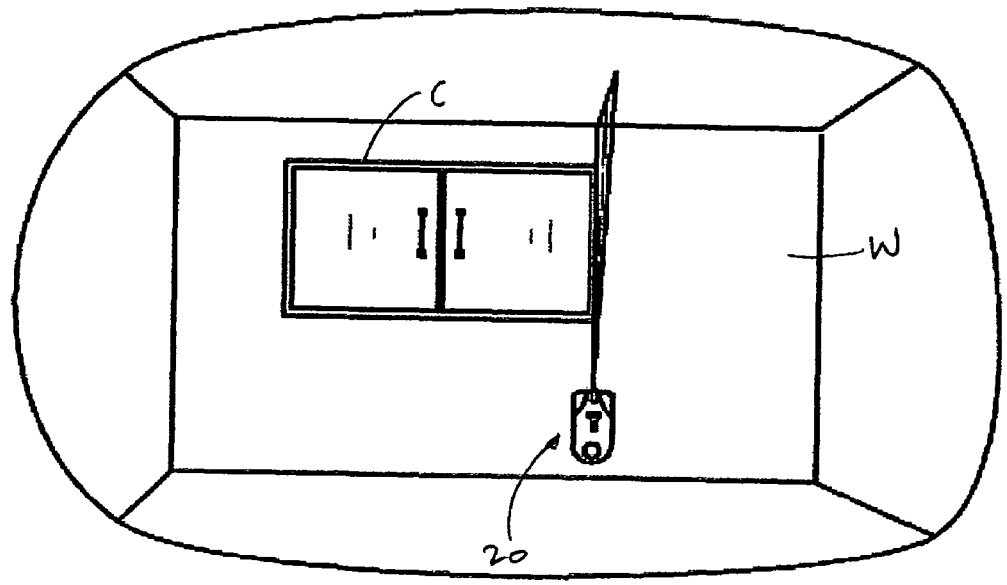
FIG. 2 is a view similar to FIG. 1, showing the device releasably secured to a wall for illuminating a vertical plane on the wall.

FIG. 2 illustrates device 20 mounted to a wall W for illuminating a vertical plane on wall W, such as for use in mounting a cabinet C. It is understood, however, that device 20 may be used in any other application in which a visual representation of a vertical plane on wall W is desired. In a manner to be explained, leveling and plumbing device 20 is temporarily secured in position on wall W in the desired orientation so as to project a horizontal or vertical line or plane on wall W.

Figure 3:
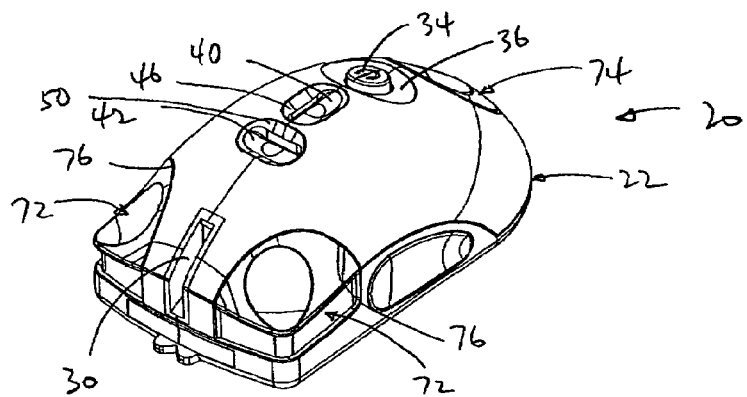
FIGS. 3 and 4 are top isometric views of the leveling and plumbing device of the present invention.
Figure 4:
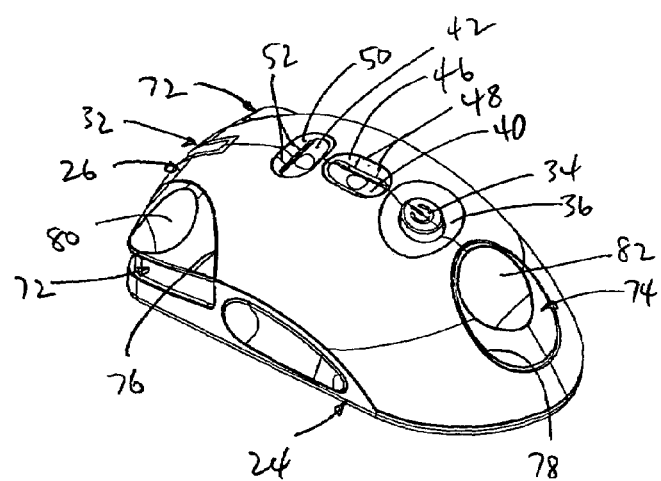
Figure 5:
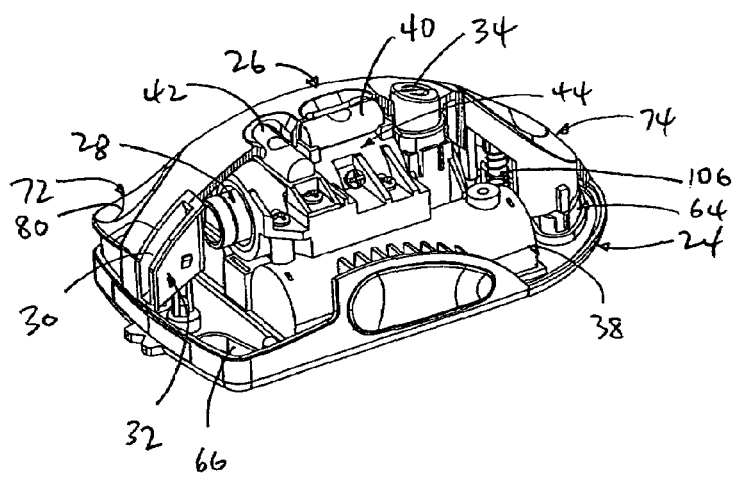
FIG. 5 is an isometric view of the leveling and plumbing device of FIGS. 3 and 4, with portions broken away to expose the internal components of the device.

Referring to FIGS. 3-5, leveling and plumbing device 20 consists of a body 22, which, in the illustrated embodiment, generally resembles a computer mouse. It is understood, however, that body 22 may have any other desired shape. Body 22 generally consists of a base 24 and a cover 26 that are assembled together.

Device 20 includes a light beam generator, which may be in the form of a laser generator 28, which is arranged to emit a planar fan of light exteriorly of body 22 through a slot 30 defined by a channel member 32. A switch 34 is located within a recess 36 defined by body cover 26, for selectively actuating laser generator 28 in a manner as is known to emit the fan of light through slot 30. In the illustrated embodiment, laser generator 28 is mounted to a battery housing 38 incorporated in base 24, although it is understood that laser generator 28 may be secured in any other satisfactory manner within the interior of body 22.

A level vial 40 and a plumb vial 42 are secured to a vial mount 44 that is fixed within the interior of body 22. Level vial 40 and plumb vial 42 each include a bubble that is longitudinally movable within the vial interior, in a known manner, for providing an indication as to the orientation of device 20. Level vial 40 is visible from the top of device 20 through an opening formed in a recess 46 defined by cover 26. The walls of recess 46 on either side of vial 40 include reference marks 48, which are used to gauge the orientation of device 20 relative to level by the position of the bubble of level vial 40 relative to reference marks 48, in a known manner. Similarly, plumb vial 42 is exposed through an opening in a recess 50 defined by cover 26. The walls of recess 50 on either side of plumb vial 42 include reference marks 52, which are used to gauge the orientation of device 20 relative to plumb by the position of the bubble of plumb vial 42 relative to reference marks 52, in a known manner.

Base 24 of body 22 defines a planar lower wall 54, which includes an opening in which a planar battery compartment cover 56 is engaged. Lower wall 54 of base 24 includes a pair of rear protrusions 58 and a front protrusion 60, which extend downwardly from the outwardly facing surface of lower wall 54.

Figure 6:
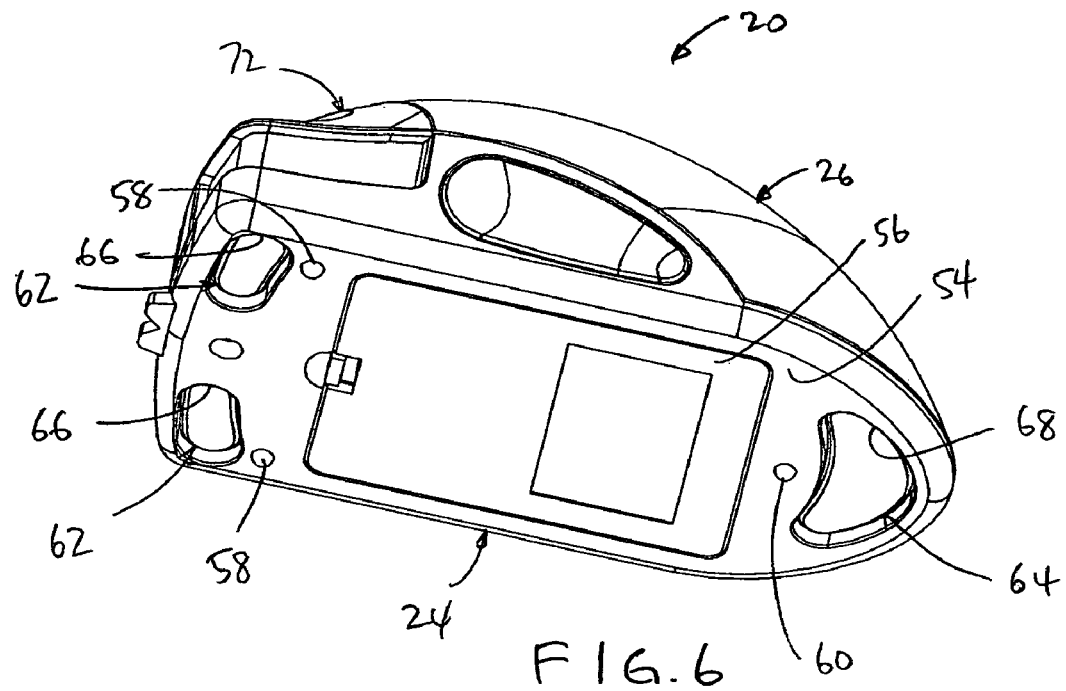
FIG. 6 is a bottom isometric view of the leveling and plumbing device of FIGS. 3-5, showing extendable and retractable engagement members incorporated in the device in a retracted position.
Figure 7:
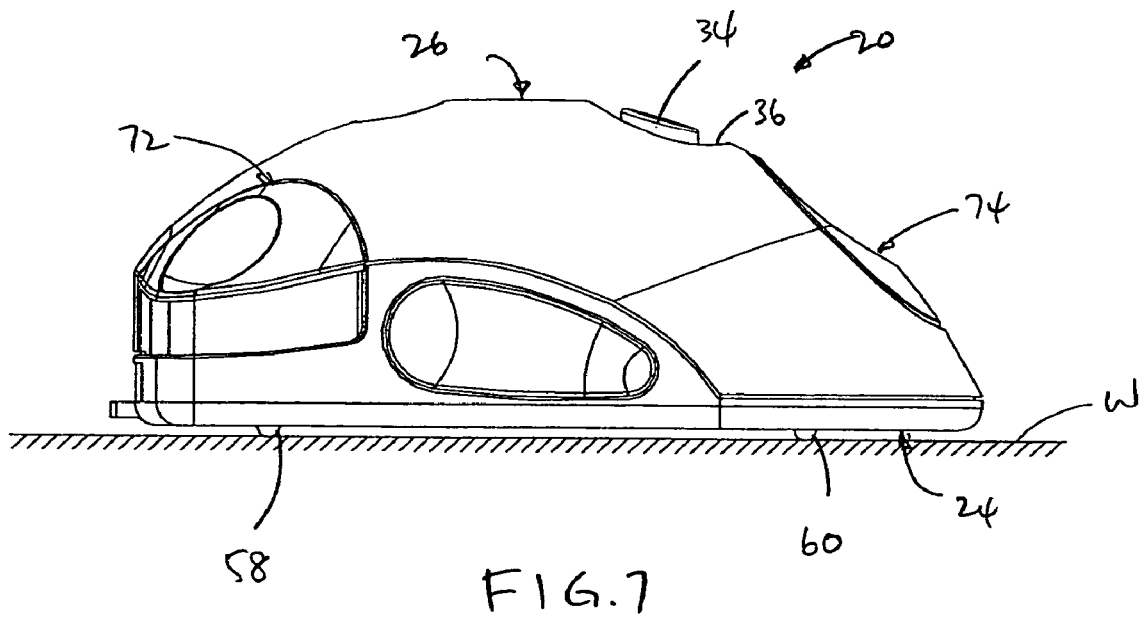
FIG. 7 is a side elevation view of the leveling and plumbing device of FIGS. 3-6, showing the engagement members in the retracted position.
Figure 8:
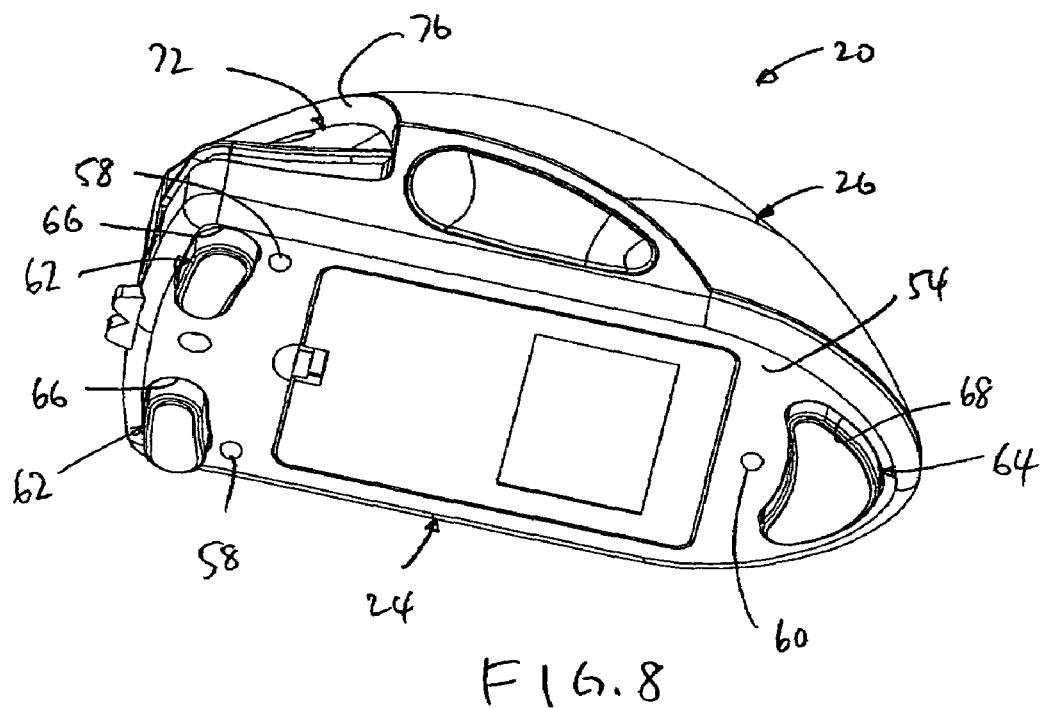
FIG. 8 is a view similar to FIG. 6, showing the engagement members incorporated in the device in an extended position.
Figure 9:
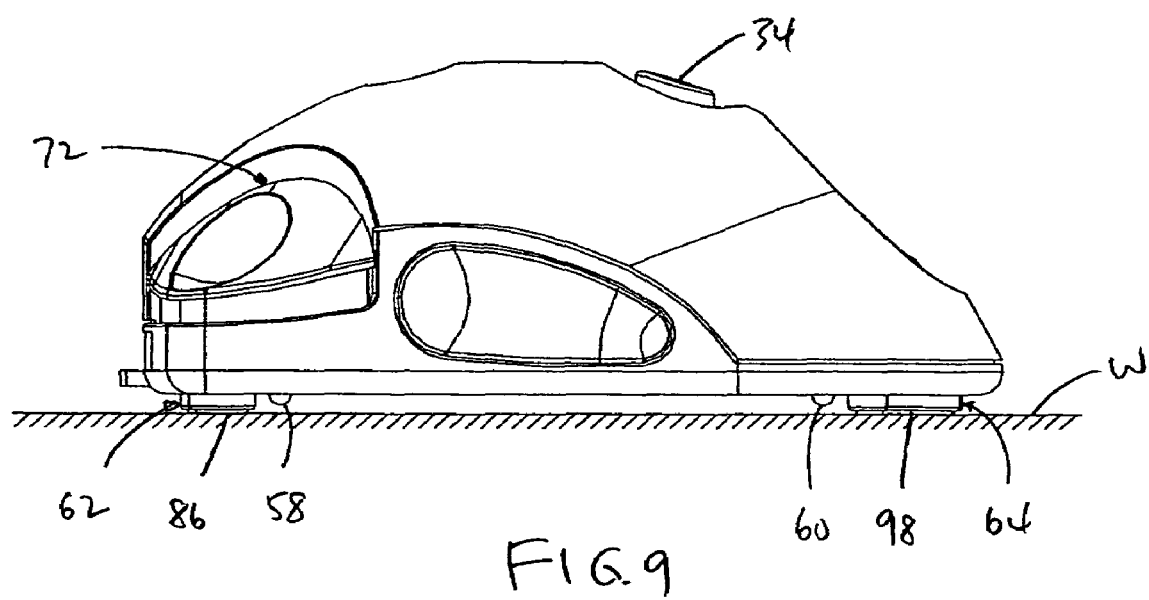
FIG. 9 is a side elevation view of the leveling and plumbing device of FIGS. 3-5 and 8, showing the engagement members in the extended position.

Referring to FIGS. 6-9, device 20 includes a number of extendible and retractable adhesive-type engagement members, including a pair of rear engagement members 62 and a front engagement member 64, for releasably securing device 20 in position on a surface, such as the surface of wall W. Engagement members 62 and 64 are movable between a retracted position as shown in FIGS. 6 and 7, and an extended position as shown in FIGS. 8 and 9. In the extended position of FIGS. 8 and 9, engagement members 62 and 64 are adhesively engaged with the surface of wall W, in a manner to be explained, to maintain device 20 in position on the surface.

Rear engagement members 62 are moveable inwardly and outwardly relative to lower wall 54 through rear openings 66 formed in lower wall 54. Similarly, front engagement member 64 is moveable inwardly and outwardly relative to lower wall 54 through a front opening 68 formed in lower wall 54. In the retracted position of FIGS. 6 and 7, engagement members 62 and 64 are positioned inwardly of lower wall 54 within respective openings 66 and 68 such that engagement members 62 and 64 are not engaged with the surface of wall W.

Each rear engagement member 62 is mounted to a rear plunger or actuator 72, and front engagement member 64 is mounted to a front plunger or actuator 74. The outwardly facing wall of cover 26 defines rear openings 76 within which rear actuators 72 are located, and a front opening 78 within which front actuator 74 is located. Each rear opening 76 in the wall of cover 26 is in alignment with one of rear openings 66 in lower wall 54. Similarly, front opening 78 is in alignment with front opening 68 in lower wall 54. In this manner, each assembled rear actuator 72 and rear engagement member 62 is movable as a unit within a passage that extends between the downwardly facing lower surface of lower wall 54 and the upwardly facing upper surface of the wall of cover 26. Similarly, the assembled front actuator 74 and front engagement member 72 is movable as a unit within a passage that extends between the downwardly facing lower surface of lower wall 54 and the upwardly facing upper surface of the wall of cover 26.

Each rear actuator 72 includes a recess or depression 80 and front actuator 74 includes a recess or depression 82. The outer surfaces of rear actuators 72 and front actuator 74 are formed such that, when actuators 72 and 74 are in the raised positions, the outer surfaces of actuators 72 and 74 blend or merge with the adjacent surface areas of base 24 and cover 26.

Figure 10:
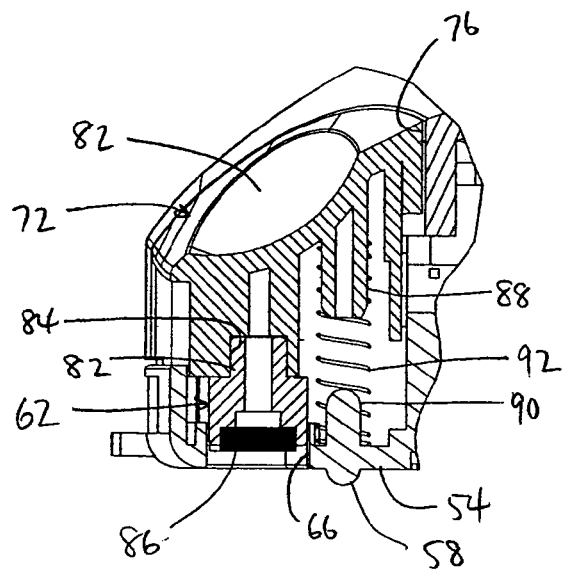
FIG. 10 is a partial section view showing a rear one of the engagement members in the retracted position of FIGS. 6 and 7.

Referring to FIG. 10, each rear engagement member 62 includes an upwardly extending mounting boss 82 that is engaged within a downwardly facing recess 84 defined by rear actuator 72, to secure rear engagement member 62 and rear actuator 72 together. Rear engagement member 62 defines a downwardly facing recess in its lower end, within which a rear adhesive member 84 is engaged. Adhesive member 84 may be in the form of a malleable mass of adhesive material although it is understood that any other type of adhesive material may be employed.

Figure 11:
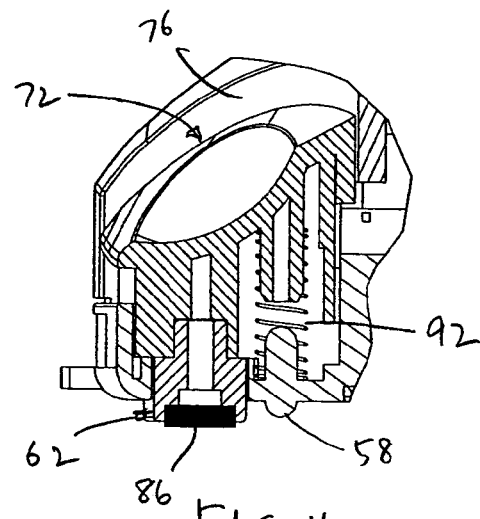
FIG. 11 is a view similar to FIG. 10, showing the rear engagement member in the retracted position.

Rear actuator 72 includes a downwardly extending projection 88, and lower wall 54 of base 24 includes an upwardly extending mounting boss 90 that is aligned with projection 86. A spring 92 is engaged at is upper end with projection 88 and at its lower end with mounting boss 90, and functions to bias engagement member 62 and actuator 72 toward a raised position as shown in FIG. 10, in which engagement member 62 is in its retracted position inwardly of the lower surface of lower wall 54 within opening 66. Actuator 72 is adapted to be moved downwardly to a depressed position as shown in FIG. 11, against the biasing force of spring 92, to move rear engagement member 62 to the extended position in which adhesive member 86 is positioned outwardly of the lower surface of base lower wall 54 and rear protrusion 58.

Figure 12:
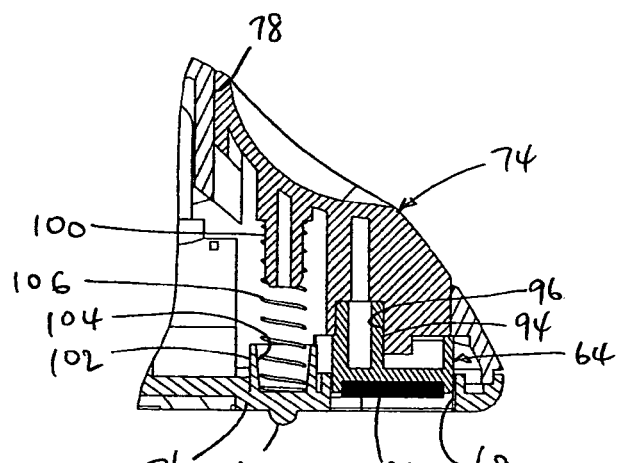
FIG. 12 is a partial section view showing a front one of the engagement members in the extended position of FIGS. 8 and 9.

In a similar manner, with reference to FIG. 12, front engagement member 64 includes an upwardly extending boss 94 that is engaged within a downwardly facing recess 96 defined by front actuator 74, to secure front engagement member 64 and actuator 74 together. Front engagement member 64 defines a downwardly facing recess in its lower end, within which an adhesive member 98 is engaged. Front adhesive member 98 is formed of the same type of adhesive material as rear adhesive members 86.

Figure 13:
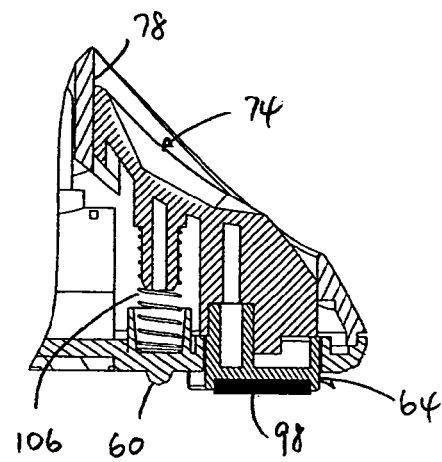
FIG. 13 is a view similar to FIG. 12, showing the front engagement member in the extended position.

Front actuator 74 includes a downwardly extending projection 100, and base lower wall 54 includes an upwardly extending cup 102 defining a recess 104 in alignment with projection 100. A spring 106 is engaged at its upper end with projection 100, and is received at is lower end within recess 104. Spring 106 functions to bias front engagement member 64 and actuator 74 toward a raised position as shown in FIG. 12, in which engagement member 64 is in its retracted position inwardly of the lower surface of lower wall 54 within opening 68. Front actuator 74 is adapted to be moved downwardly to a depressed position as shown in FIG. 13, against the biasing force of spring 106, to move front engagement member 64 to the extended position in which front adhesive member 98 is positioned outwardly of the lower surface of base lower wall 54 and front protrusion 60.

In use, device 20 is positioned on a surface, such as the surface of wall W, by placing device 20 on the surface such that rear protrusions 58 and front protrusion 60 engage the surface so as to place the lower surface of base lower wall 54 slightly outwardly from the surface of wall W. The user manually positions body 22 of device 20 in a desired orientation, such as in a horizontal orientation as shown in FIG. 1 or a vertical orientation as shown in FIG. 2. The user employs level vial 40 or plumb vial 42, and the associated respective reference marks 48 and 52, in order to accurately position device 20 in the desired orientation. During positioning of device 20 in this manner, engagement members 62 and 64 are maintained in the retracted positions of FIGS. 6 and 7, so as to enable device 20 to be freely moved on the surface to achieve the desired position. When device 20 is positioned in the desired orientation, the user depresses rear actuators 72 and front actuators 74 so as to move rear engagement members 62 and front engagement members 64 from the retracted position to the extended position as shown in FIGS. 8 and 9, which causes rear adhesive members 86 and front adhesive member 98 to come into contact with the surface of wall W. The adhesive properties of adhesive members 86 and 98 cause respective rear engagement members 62 and front engagement members 64 to adhere to the surface of wall W, and to maintain rear engagement members 62 and front engagement members 64 in the extended position against the force of respective springs 92 and 106. The adhesion of rear engagement members 62 and front engagement member 64 to the surface of wall W thus functions to maintain device 20 in engagement with the surface of wall W in the desired orientation. If necessary, the orientation of device 20 can be adjusted slightly after engagement members 62 and 64 are adhesively secured to the surface of wall W, due to the malleability of the material of adhesive members 86 and 98. The user then actuates switch 34, and laser generator 28 emits a planar fan of light, which impinges on the surface of wall W to illuminate a line on wall W having a desired orientation. After use, the user applies a manually outwardly force on device 20, which overcomes the adhesive bond between adhesive members 86, 98 and the surface of wall W. Upon such removal of device 20, springs 92 and 106 function to return engagement members 62, 64, respectively, to the retracted positions and actuators 72, 74, respectively, to the raised positions.

Adhesive members 86 and 98 can be removed from the respective recesses in rear and front engagement members 62, 64, respectively. In a known manner, the user can manually roll and manipulate the material of the adhesive members to rejuvenate the adhesive properties of the adhesive members, which can then be replaced within the recesses in rear and front engagement members 62, 64 for subsequent use. In the event adhesive members 86 and 98 completely lose their adhesive properties, the user can install replacement adhesive members on rear and front engagement members 62, 64, respectively.

It can thus be appreciated that device 20 can be quickly and easily mounted to a surface in a manner that does not mark or penetrate the surface, as is the case with the pin-type mounting arrangement of the prior art. The device 20 can be slightly repositioned as necessary after engagement with the surface, so as to provide accuracy in positioning of the device on the surface.

While the invention has been shown and described with respect to a specific embodiment, it is understood that various alternatives and modifications are possible and are contemplated as being within the scope of the present invention. For example, and without limitation, device 20 may have any overall shape and configuration, and is not limited to the specific shape or construction as shown and described. Representatively, the device may be in the form of a laser level square that is adapted for mounting to a surface such as a floor or wall, and that includes a laser emitter arrangement that emits two perpendicular beams onto the surface onto which the laser level square is mounted. The device also may be in the form of a laser-type level that is releasably mounted to a surface, such as a wall or floor, by use of extendible and retractable adhesive engagement members, and that has a self-leveling laser emitter arrangement that projects intersecting light beams or planes onto the surface directly below the device. It is also understood that the compression-type springs as shown and described for biasing the engagement members toward the retracted position may be replaced with any satisfactory biasing arrangement, such as torsion-springs or resilient, compressible materials or any other satisfactory mechanism for urging the engagement members towards the retracted position. The plungers or actuators, which are used to move the engagement members from the retracted position to the extended position, may be in the form of buttons or other structure that extends upwardly from, or downwardly into, the surrounding surface areas of the body. It is also understood that other types of actuators may be used to move the engagement members from the retracted position to the extended position, such as a lever-type arrangement or the like. The adhesive material, which is mounted in a recess in the downwardly facing surface of the engagement member, may be any type of adhesive member that is capable of releasably or temporarily engaging a surface to maintain the body in position relative to the surface, such as adhesive putty as shown and described or a selectively removable adhesive pad such as available from 3M under the designation COMMAND. The adhesive member may or may not be removable relative to the engagement member. The protrusions on the lower wall of the device, which engage the surface prior to movement of the engagement members to the extended position, may be removed altogether or replaced with any other type of structure that engages the surface and enables the device to be moved on the surface.

Various alternatives and embodiments are contemplated as being within the scope of the following claims particularly pointing out and distinctly claiming the subject matter regarded as the invention.

I claim:

1. A leveling device for use on a work surface, comprising:
   a body defining an engagement surface facing in a first direction and one or more manually engageable surfaces facing in a direction away from the first direction;
   a light beam emitter contained within the body for emitting a light beam exteriorly of the body in a predetermined orientation relative to the body; and
   an engagement arrangement associated with the body for selectively maintaining the body in position on the work surface, including a plurality of spaced apart engagement members and an adhesive carried by the plurality of engagement members, wherein the plurality of engagement members are movable between a retracted position in which the adhesive is positioned inwardly of the engagement surface of the body and an extended position in which the adhesive is positioned outwardly of the engagement surface of the body for engagement with the work surface to selectively maintain the body in position on the work surface;
   wherein each engagement member is movable from the retracted position to the extended position in response to manual engagement of an actuator which is manually accessible from one of the manually engageable surfaces of the body; and
   wherein the body and the plurality of engagement members associated with the body are configured and arranged such that an adjacent pair of the actuators are spaced sufficiently close together to enable a user to simultaneously manually move the pair of actuators inwardly relative to the body using one hand, wherein the simultaneous inward movement of the pair of actuators is operable to simultaneously move an associated pair of engagement members from the retracted position to the extended position to engage the body with the work surface.

2. The leveling device of claim 1, further comprising a biasing arrangement associated with the engagement arrangement for biasing the plurality of engagement members toward the retracted position.

3. The leveling device of claim 2, wherein the biasing arrangement comprises a spring that is configured and arranged to act on each engagement member to bias the engagement member toward the retracted position.

4. The leveling device of claim 1, wherein the body includes a passage within which each engagement member is located, wherein the passage extends between the one or more manually engageable surfaces and the engagement surface of the body.

5. The leveling device of claim 1, wherein the adhesive carried by each engagement member is contained within a recess in an end defined by the engagement member.

6. The leveling device of claim 5, wherein the adhesive comprises a mass of adhesive material that is removable from within the recess.

7. A method of maintaining the position of a leveling device on a work surface, comprising the acts of:
   providing a leveling device that includes: a body, wherein the body defines an engagement surface facing in a first direction and one or more manually engageable surfaces facing in a direction away from the first direction; a light beam emitter contained within the body for emitting a light beam exteriorly of the body in a predetermined orientation relative to the body; and an engagement arrangement associated with the body for selectively maintaining the body in position on the work surface, including a plurality of spaced apart engagement members and an adhesive carried by the plurality of engagement members, wherein the plurality of engagement members are movable between a retracted position in which the adhesive is positioned inwardly of the engagement surface of the body and an extended position in which the adhesive is positioned outwardly of the engagement surface of the body, wherein each engagement member is movable from the retracted position to the extended position in response to manual engagement of an actuator which is manually accessible from one of the manually engageable surfaces of the body, wherein each engagement member is movable from the retracted position to the extended position in response to manual engagement of an actuator which is manually accessible from one of the manually engageable surfaces of the body;
   positioning the body of the leveling device such that the engagement surface of the body engages the work surface and the leveling device is in a desired orientation on the work surface; and
   extending a pair of the engagement members from the retracted position within the body to the extended position externally of the body into engagement with the work surface, wherein the body and the plurality of engagement members associated with the body are configured and arranged such that an adjacent pair of the actuators are spaced sufficiently close together to enable a user to simultaneously manually move the pair of actuators inwardly relative to the body using one hand, and wherein the act of extending the pair of engagement members from the retracted position to the extended position is carried out by using one hand such that the simultaneous inward movement of the pair of actuators is operable to simultaneously move an associated pair of engagement members from the retracted position to the extended position to engage the body with the work surface, wherein the adhesive releasably adheres to the work surface to maintain the leveling device in the desired orientation on the work surface.

8. The method of claim 7, wherein the engagement surface of the body faces the work surface, and wherein the act of extending the one or more engagement members from the retracted position to the extended position is carried out by moving each of the one or more engagement members outwardly relative to a recess that opens onto the engagement surface of the body and within which engagement member is movably mounted.

9. The method of claim 8, further comprising the act of biasing each engagement member inwardly toward the retracted position, wherein engagement of the adhesive with the work surface functions to maintain the engagement member in the extended position against the inward bias.

10. The method of claim 9, wherein the act of biasing each engagement member inwardly toward the retracted position is carried out by engaging a spring with each engagement member.

11. The method of claim 9, wherein each engagement member is mounted within a passage that extends inwardly from the manually engageable surfaces such that the actuator associated with each engagement member faces upwardly from the passage.

12. A leveling device for use on a work surface, comprising:
- a body defining an engagement surface facing in a first direction and including a plurality of passages that extend inwardly from the engagement surface, wherein the body further defines and one or more manually engageable surfaces facing in a direction away from the first direction;
- a light beam emitter contained within the body for emitting a light beam exteriorly of the body in a predetermined orientation relative to the body;
- a plurality of extendible and retractable engagement members, wherein each extendible and retractable engagement member is movable within one of the passages between a retracted position in which the engagement member is positioned within the passage, and an extended position in which the engagement member is moved outwardly within the passage, wherein each engagement member is movable from the retracted position to the extended position in response to manual engagement of an actuator which is manually accessible from one of the manually engageable surfaces of the body, wherein each actuator defines an outwardly facing actuator engagement surface that is manually accessible from the manually engageable surfaces of the body to enable a user to depress the actuator to move the engagement member from the retracted position to the extended position;
- wherein the actuator engagement surface of each actuator is flush with adjacent areas of the manually engageable surfaces of the body that are adjacent the actuator engagement surface when the engagement member is in the retracted position;
- an adhesive carried by each engagement member, wherein, when the engagement member is in the retracted position, the adhesive is positioned inwardly of the engagement surface of the body and wherein, when the engagement member is in the extended position, the adhesive is positioned outwardly of the engagement surface of the body for engagement with the work surface to selectively maintain the body in position on the work surface;
- a spring engaged between the body and each engagement member for biasing the engagement member toward the retracted position, wherein, when the engagement member is in the extended position and the adhesive is engaged with the work surface to maintain the body in position on the work surface, the adhesive maintains the engagement member in the extended position against the bias of the spring.

13. A leveling device for use on a work surface, comprising:
- a body defining an engagement surface and one or more manually engageable surfaces facing in a direction away from the first direction;
- light beam emitter means contained within the body for emitting a light beam exteriorly of the body in a predetermined orientation relative to the body; and
- releasable adhesive engagement means movably interconnected with the body for selectively maintaining the body in position on the work surface, wherein the adhesive engagement means comprises a plurality of engagement members, each of which is movable relative to the body to an extended position in which the engagement member is engaged with the work surface to releasably maintain the body in position on the work surface, wherein each engagement member is movable from the retracted position to the extended position in response to manual engagement of an actuator which is manually accessible from one of the manually engageable surfaces of the body, wherein each actuator defines an outwardly facing actuator engagement surface that is manually accessible from the manually engageable surfaces of the body to enable a user to depress the actuator to move the engagement member from the retracted position to the extended position;
- wherein the actuator engagement surface of each actuator is flush with adjacent areas of the manually engageable surfaces of the body that are adjacent the actuator engagement surface when the engagement member is in the retracted position.

14. The leveling device of claim 13, further comprising biasing means associated with the releasable adhesive engagement means for biasing each engagement member toward the retracted position.

15. The leveling device of claim 14, wherein the releasable adhesive engagement means includes a releasable adhesive carried by each engagement member, wherein the biasing means comprises a spring that acts on each engagement member for biasing the engagement member to the retracted position in which the releasable adhesive is not exposed to the work surface.

* * * * *